May 5, 1936. M. P. HOLMES Re. 19,954

EXPLOSIONPROOF MINING APPARATUS

Original Filed May 6, 1915 4 Sheets-Sheet 1

Inventor:
Morris P. Holmes.
by Emery, Booth, Janney & Varney
Attys

May 5, 1936. M. P. HOLMES Re. 19,954

EXPLOSIONPROOF MINING APPARATUS

Original Filed May 6, 1915 4 Sheets-Sheet 2

Inventor:
Morris P. Holmes,
by Emery, Booth, Janney & Varney
Attys.

May 5, 1936. M. P. HOLMES Re. 19,954

EXPLOSIONPROOF MINING APPARATUS

Original Filed May 6, 1915 4 Sheets-Sheet 3

Inventor:
Morris P. Holmes,
by Emery, Booth, Janney & Varney
Attys

EXPLOSIONPROOF MINING APPARATUS
Original Filed May 6, 1915 4 Sheets-Sheet 4
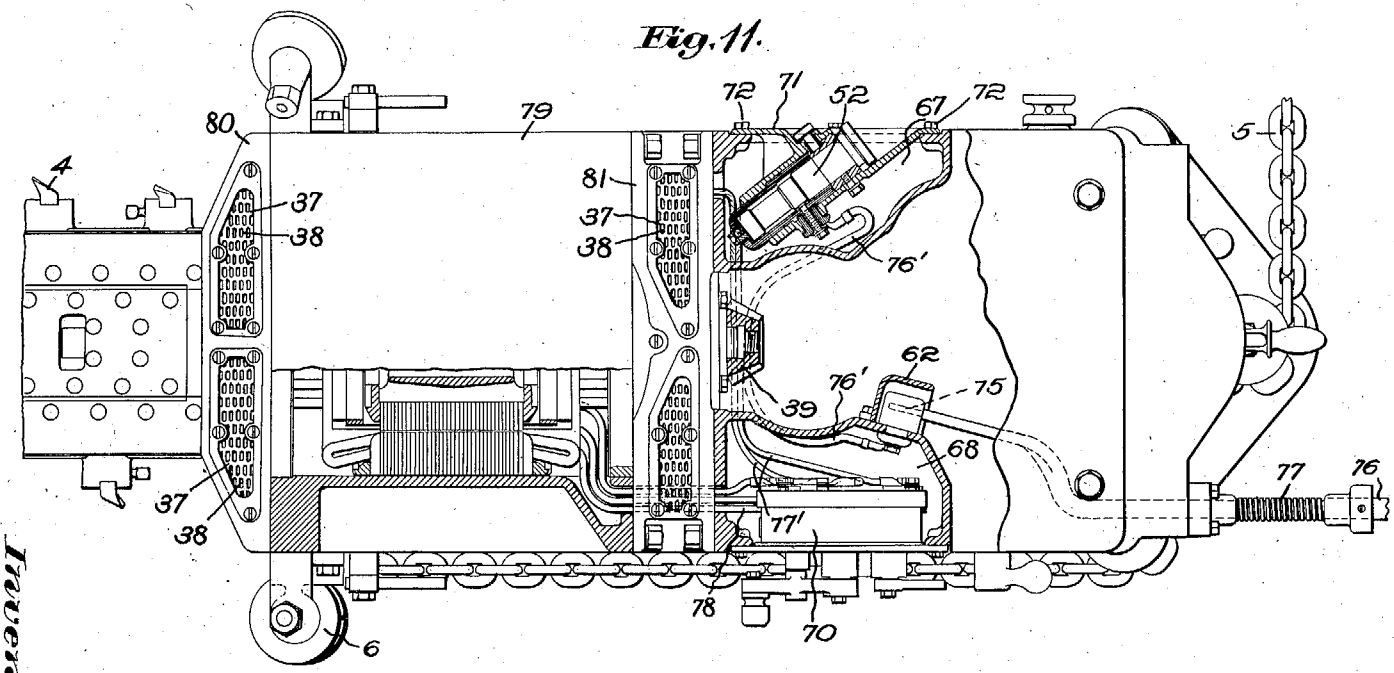
Inventor:
Morris P. Holmes,
by Emery, Booth, Janney & Varney
Attys.

Reissued May 5, 1936 Re. 19,954

UNITED STATES PATENT OFFICE 19,954

EXPLOSIONPROOF MINING APPARATUS

Morris P. Holmes, Claremont, N. H., assignor, by mesne assignments, to Sullivan Machinery Company, a corporation of Massachusetts Original No. 1,720,364, dated July 9, 1929, Serial No. 26,413, May 6, 1915. Renewed June 4, 1923. Application for reissue April 10, 1933, Serial No. 665,467

19 Claims. (Cl. 172—36)

This invention relates to mining machines and particularly though not exclusively to machines of the cutter chain type which are fed along the face or side of the wall in which the cutting is being made. The invention peculiarly relates to an explosion proof apparatus of this general character.

So far as the power transmission features and general operation are concerned, my invention is of the general type shown in my earlier applications Serial Nos. 524,936, 548,769, 833,782 and 859,280, to which reference may be made for a more detailed description of certain features of the apparatus and particularly of the transmission mechanism.

An important object of my invention is to render explosion proof electrically driven mining machines for use in gaseous mines. Other important objects of my invention will be set forth in and will appear from the detailed description.

In order that the principle of the invention may be readily understood, I have disclosed a single embodiment thereof in the accompanying drawings, wherein—

Fig. 11 is a view, mainly in plan and partially in horizontal section, of an alternating current, electrically driven apparatus embodying my invention.

Figure 1:
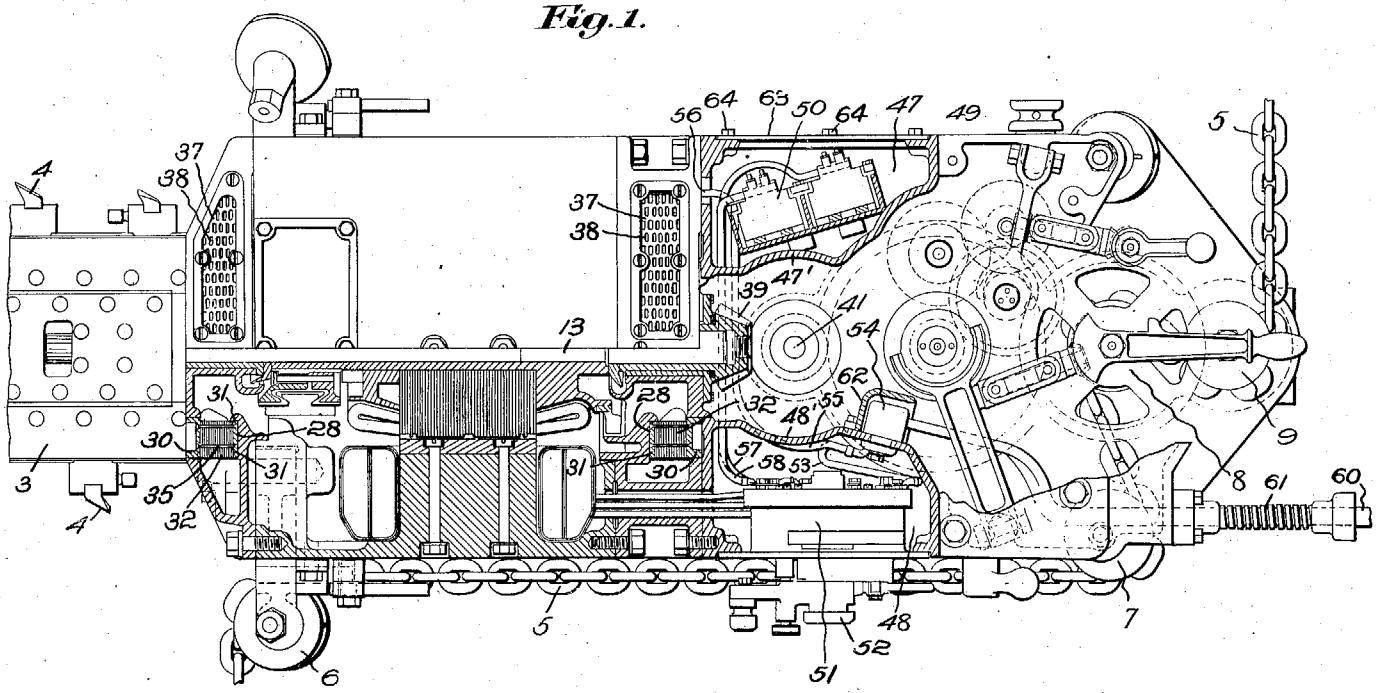
Fig. 1 is a view partially in plan and partially in horizontal section of a mining machine of the chain cutter type driven by a direct current electric motor.

Referring to the drawings and to the embodiment of my invention selected for purposes of illustration, there is therein disclosed an electrically driven chain mining machine of the so-called room and pillar type adapted to make a continuous cut while traveling close to the face of the mine, the top of the mine being usually posted or permitted to drop except in the narrow space in which the machine travels. While I have shown my invention as embodied in such a type of machine, it is to be understood that it is applicable as to certain of its features to machines of other types and construction.

Referring more particularly to the drawings and first to Figs. 1 to 4 thereof, I have therein represented a machine having a bottom shoe 1 adapted to slide if desired directly upon the bottom or floor of the mine. Bolted or otherwise suitably secured to said shoe is a casting 2 of any suitable construction and extending substantially the entire length of said shoe. Suitably mounted upon the machine, as, for example, upon the casting 2 is a cutter bar or device 3 preferably carrying as usual a suitable cutter chain 4. The said cutter chain is adapted to be moved by a suitable sprocket wheel or other device driven in turn through suitable power transmission gearing from the engine motor in a manner not necessary more fully to describe. The said cutter bar is adapted to be adjusted in the usual or any desired manner. In order to hold the cutter chain and the cutter bar in the desired relation against the work as the machine is being fed along, guiding means are provided, the same, in the disclosed embodiment of the invention, consisting of a chain, cable or other appropriate flexible guiding means, preferably kept under tension and so associated with the machine that the cutter bar, as it travels, is held up to the work without the actual necessity of rails, tracks or other like guiding supports, although the latter may be employed if desired.

In the illustrated form of the invention, there is provided for this purpose flexible guiding means consisting of a suitable chain or chains 5 indicated in Fig. 1 and preferably comprising two portions or lengths, one passing to the advancing side of the machine and the other to the receding side thereof, whereat each is connected to a fixed support. One portion is connected to the machine adjacent its wall or cutting end and the other near the opposite or rear end thereof. If desired and preferably these two lengths or portions form parts of a single, unbroken cable length or chain, one end of which is drawn into the machine as the other end is paid off. Preferably the leading cable length on the advancing side of the machine passes about a guiding sheave 6 journaled about a substantially upright axis, preferably near the foremost inner or wall corner of the machine. As therein shown, the chain or cable thence passes about a guiding sheave 7 at the rear end of the machine, to and about a feed driving member 8 which may consist of a sprocket wheel located near the rear end of the machine and driven by appropriate power transmission mechanism. The chain thence passes about a suitable guiding member 9. The free end of the leading chain portion is preferably secured to a suitable anchor, while the end of the receding or trailing chain portion is secured to a fixed and preferably adjustable support, such as a take-up jack of the general type described in the patent to Mitchell No. 656,414. The two chain or cable portions therefore, when under tension and with the cutter chain engaging the coal, serve to hold the cutter bar in its assigned position and the latter can be regulated by adjusting the tension on the trailing chain portion so as to vary the position of the machine.

The bottom shoe 1 extends preferably for the entire width and extent of the machine and the cutter bar is supported as described or in any other suitable manner, as, for example, so that it may be locked in cutting position at either side of the machine, thereby adapting the machine for use in long wall cutting in either direction, or such cutter bar may be locked lengthwise of the machine for convenience in transportation or for the purpose of making a starting or sumping cut if desired. The means for locking the cutter bar in any of its positions may, if desired, be such as disclosed in my application Serial No. 524,936.

The main purpose and object of my invention are to provide an electrically driven apparatus of this general type, which shall be thoroughly explosion proof and therefore adapted for use in gaseous mines. For this purpose, I employ an electric motor which may be of any suitable type. In the construction shown in Figs. 1 to 4 inclusive, I have reperesented a mining machine driven by a direct current electric motor, and in Fig. 11, I have represented substantially the same machine driven by an alternating current motor. My invention is clearly applicable to both or other types of electrically driven motors.

Figure 2:
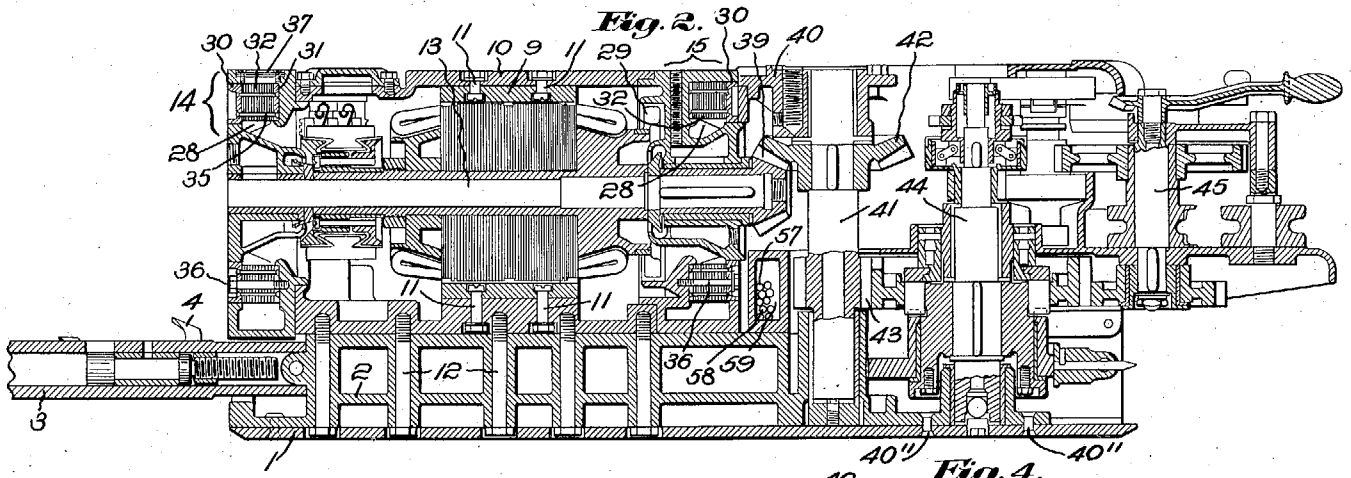
Fig. 2 is a vertical central longitudinal section of the apparatus shown in Fig. 1.
Figure 4:
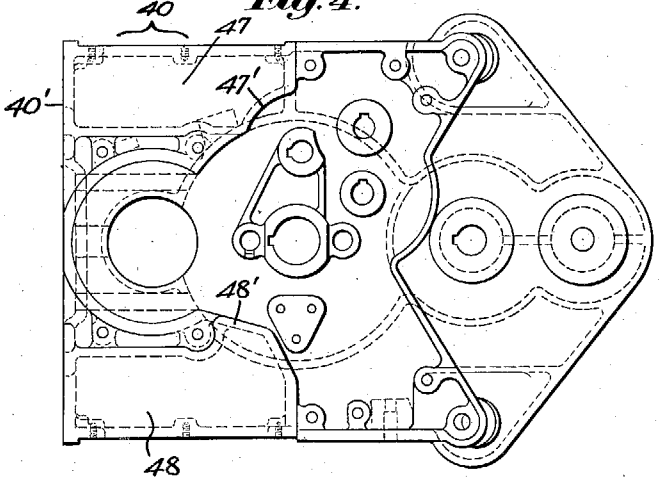
Fig. 4 is a plan view partly in outline of the main frame of the machine.
Figure 3:
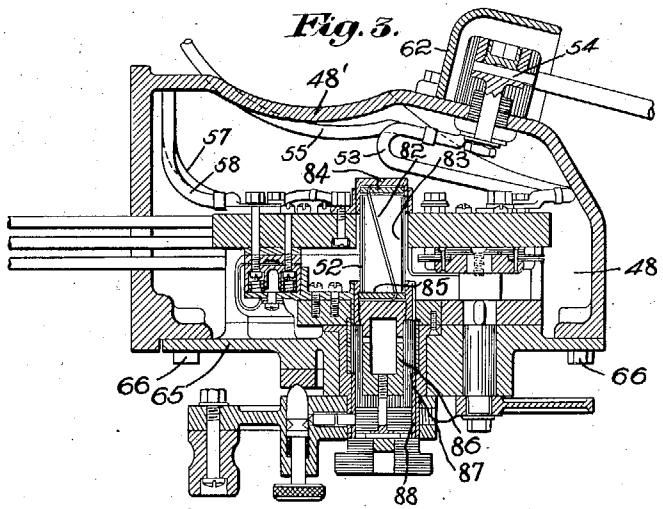
Fig. 3 is a detail in section of a portion of the apparatus shown in Fig. 1 and particularly illustrating the controller and adjacent parts and connections.
Figure 5:
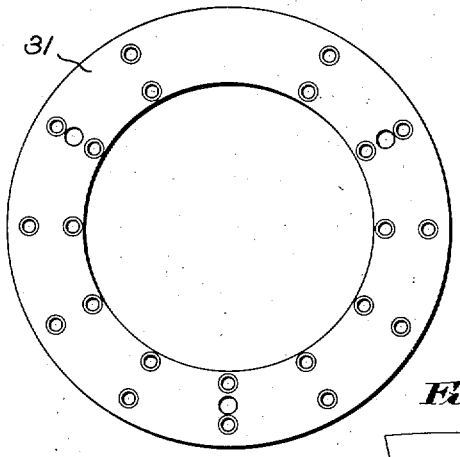
Fig. 5 is a plan view of the inner ring of the protective device or so-called muffler.

The motor itself, which may be of any suitable or approved construction, is sufficiently illustrated in Figs. 1 and 2, and need not be described in detail. By a change of field coils and rotor, it is adapted for use in various types of motor frames and frame heads or bearings.

The motor is generally indicated at 9 and is mounted in and secured to the body casing 10 by bolts 11 or in any other suitable way. The said body casing is shown as secured to the casting 2 by a series of bolts 12 passing through the shoe, and the casting and into said body casing 10. The main or drive shaft 13 of the motor extends through the latter and the body casing 10 and is mounted in suitable bearings in the bearing heads, generally indicated at 14, 15, said heads being shown of slightly different construction.

The bearing heads may be provided with flanges to attain a tight fitting to the ends of the body casing 10 and may be secured therein in any suitable way. Each head has a suitable bearing for the main shaft 13. Ball bearings for end thrust and roller bearings for radial thrust may be used.

It is of extreme importance that means be provided to keep the motor cool and particularly that means be provided to permit and compel the sweep of air over the entire electrical portion of the motor, thereby not only increasing the length of life and the durabiliity thereof, but also obtaining a higher rating for the motor than would be possible without the use of such cooling agency.

Owing to the fact that the apparatus is particularly intended for use in gaseous mines, such as coal mines, it is evident that if the air of the mine be permitted to flow past the motor in an uninterrupted or free manner, disastrous explosions will inevitably occur. It is of the highest importance, however, that suitable means be provided for effecting the proper ventilation of the motor. I have succeeded in overcoming the danger of explosions and have rendered the machine wholly explosion-proof while at the same time I have succeeded in suitably cooling and preferably suitably ventilating the motor. This result I preferably accomplish by the use of so-called protective devices or mufflers which may be applied at suitable points so as to insure the circulation of the external air past the motor while preventing all liability of explosion. This result is broadly accomplished by suitable means, through the agency of which the incoming and the outgoing air is divided into a multiplicity of very fine streams upon the principle of the Sir Humphrey Davy lamp.

Figure 6:
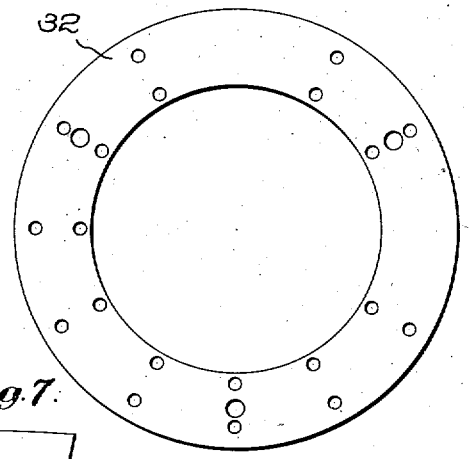
Fig. 6 is a plan view of one of the intermediate rings thereof.
Figure 7:
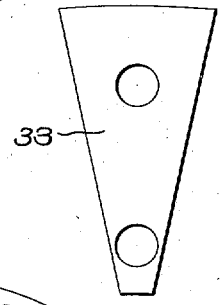
Fig. 7 is a plan view of one of the spacer segments thereof.
Figure 8:
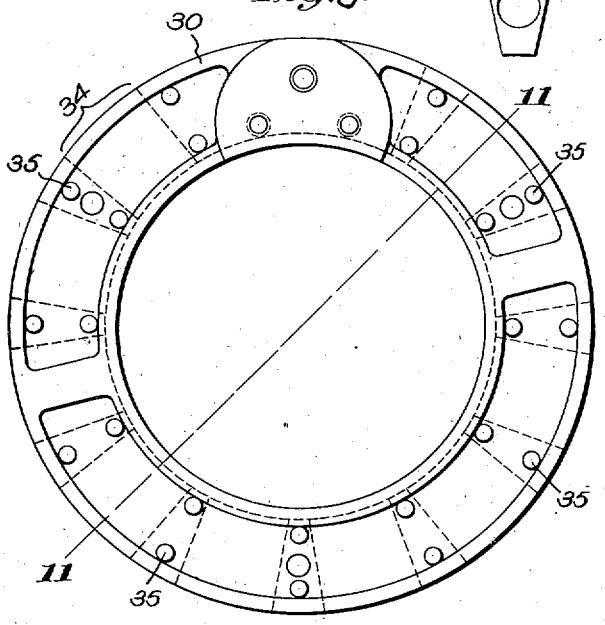
Fig. 8 is a plan view of the outer ring thereof.
Figure 9:
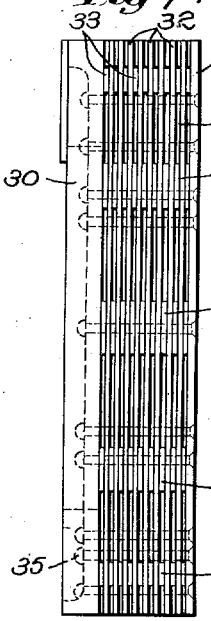
Fig. 9 is a side elevation of one of the protective devices or mufflers showing the parts thereof in assembled relation.
Figure 10:
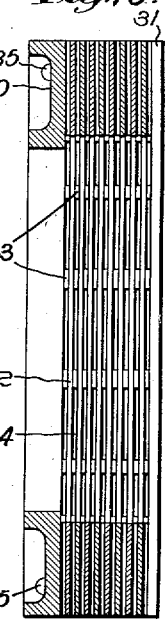
Fig. 10 is a vertical section thereof.

For this purpose I provide each of the bearing heads 14, 15 with an annular recess 28 in communication with the external air, the air being preferably admitted through the recess in the front bearing head 14 and discharged through the recess in the rear head 15, the air being circulated through the motor in any suitable manner and preferably by means of a fan 29 mounted upon the shaft 13, as shown most clearly in Fig. 2. In order to divide the incoming and outgoing air into a multiplicity of fine streams, I provide suitable protective devices, and in the selected embodiment of my invention I have represented for this purpose a series of very thin plates suitably spaced but held in face to face relation in very close proximity. For this purpose and as shown most clearly in Figs. 5 to 10 inclusive, I provide an outer relatively thick plate 30 shown in Fig. 9 as having the form of a ring. The inner plate is represented at 31 and is preferably though not necessarily of less thickness than the plate 30. Between the plates 30, 31 I position in face to face relation a series of plates 32, one of which is indicated in Fig. 6. In actual use, I have employed in each group, 53 plates, 32, each having a thickness of .0187 inch and separated by segmental spacers 33, shown in Fig. 7, and preferably of the same thickness. By constructing said spacers of a segmental form, I provide air channels 34 of equal dimensions throughout. In the particular instance referred to, I thus provide 648 channels through which the air is admitted in a multiplicity of fine streams. In a similar manner, the air is discharged at the opposite end of the motor.

The said plates 30, 31, 32 and spacers 33 are secured in assembled relation in any suitable manner and preferably by rivets 35 extending through all of said parts which may be and preferably are assembled prior to positioning them in the annular recesses 28. The said assembled rings are secured in place in said annular recesses in any suitable manner, as by a suitable number of bolts 36 tapped into the bearing heads. In the construction referred to, I obtain through the use of the two protective devices or muffler rings a total relief area of 27,677 square inches. Obviously, however, parts of other dimensions and form may be employed within the scope and purpose of my invention.

The external air may be admitted to and discharged from the bearing heads 14, 15 throughout any suitable portion of the circumference thereof. Preferably overlying the air inlet and air discharge, I position plates 37 having a series of relatively small holes 38.

The main drive shaft 13 extends through the inner bearing head 15 and is there provided with a suitable gear here shown as beveled pinion 39 by which power is transmitted to the chain 5. The transmission of power from the main drive shaft 13 may be effected in any suitable manner. In order to support the gearing, shafts or elements employed for this purpose, I preferably provide a main frame structure 40 which I have shown somewhat in outline in Fig. 4. The said frame 40 is suitably shaped to receive and support the shaft and other parts of the power transmission mechanism, and is herein represented as provided with a substantially vertical front end or face 40′ which is adapted to be secured by a series of bolts to the adjacent end of the bearing head 15, as indicated in Fig. 2, the frame being partially supported by the casting 2 and in part by the rear end of the shoe 1 to which a portion of the casting 2 that is of reduced thickness is represented as secured by bolts 40″.

Within the same frame 40 I have, in the disclosed embodiment of the invention, mounted an upright shaft 41 having thereon a beveled gear 42 meshing with and driven by the pinion 39 upon the main drive shaft 13. The said shaft 41 is further provided with a gear 43 meshing with a suitable gear upon the upright shaft 44, the latter being if desired provided with clutch or other devices with which may be associated means whereby the drive may be reversed, so that the chain 5 may be moved in either direction. The sprocket gear 8 is mounted upon an upright shaft 45 driven in suitable manner from the shaft 44 and preferably located near the rear center of the machine. To drive such sprocket gear from the power shaft any suitable transmission gearing is provided whereby, as is customary, the machine may be driven at either one of a plurality of speeds and preferably through frictional or other yielding transmission devices. The details of the feed gearing are indicated upon the drawings, but since they are not herein specifically claimed, further description is unnecessary. These features may be of the general type shown in said earlier application filed by me.

The main frame 40 supports at its rear and central portion the main portion of the power transmission mechanism and is so constructed and arranged as to receive through its forward vertical or upright face 40′ the beveled pinion 39 upon the main drive shaft 13. In connection with the motor I provide a suitable controller and a suitable resistance together with connections leading thereto and thence to the motor. It is of extreme importance that these parts be enclosed in order to render the machine explosion-proof. At the same time, it is highly important that these parts be conveniently located and readily accessible. In carrying out my invention I have provided the main frame 40 with chambers indicated in Fig. 1 at 47, 48, the inner walls 47′, 48′ of said chambers being preferably integrally formed with the body of said main frame 40. These chambers are accessible at the sides of the frame. In this manner I obtain absolute protection for the electric motor and parts pertaining thereto; I achieve a great compactness of arrangement; I secure thereby a maximum remaining space for the location of the power transmission gearing; by means of the described location I obtain a balance or symmetry of parts, thus facilitating the steady and proper movement of the machine in operation; I secure ready accessibility to the devices enclosed in said chambers; and the inner walls of said chambers also materially strengthen the entire structure and particularly the main frame work 40.

Within the scope and purpose of my invention, the location of these chambers and the construction thereof may be varied, but by the disclosed construction and arrangement I secure the advantages recited.

Within the chamber 47, with the type of electric motor shown in Fig. 1, I position a suitable resistance 50, and within the chamber 48 I position a suitable controller 51. The controller 51 which is preferably provided with a fuse plug, such as indicated generally at 52, has a conductor 53 leading to one of two terminals generally indicated at 54 in Figs. 1 and 3. Another conductor 55 leads to the motor as indicated at 56. Conductors 57, 58 lead from the controller to the resistance 50 within the chamber 47, said conductors passing through a conduit 59, shown in Fig. 2, formed in the main frame 40. The conductor cable 60 leading to the machine is preferably provided with a flexible metallic armor 61 and suitable holding and insulating means and leads to the terminals 54, which, as shown, are partially enclosed by a hood 62, said terminals 54 being suitably insulated as indicated most clearly in Fig. 3.

It will thus be observed that the apparatus is provided with but a single terminal element not wholly enclosed. Thus the danger of explosion is reduced to an absolute minimum.

It will be observed that the resistance 50 and the controller 51 are rendered readily accessible. For that purpose I have herein represented the chamber 47 as provided with a cover or plate 63 suitably secured in position, as by means of bolts or screws 64. The chamber 48 is similarly provided with a cover or plate 65 secured in position by bolts or screws 66.

In Fig. 11, I have shown a form of my invention particularly adapted for use with an alternating current motor. Preferably the motor main casing and bearing heads are constructed similarly to those shown in Figs. 1 to 4 inclusive, and preferably also the main frame of the machine is similar to the frame 40, shown in said figures and is similarly secured in position. Preferably also I provide chambers 67, 68, within which I position respectively one or more fuse plugs similar to the fuse plug 52 shown in Fig. 3, and a suitable controller 70, the latter being preferably similar to the controller 51 shown in Figs. 1 to 4. Within the chamber 67 I may position one or more fuse plugs and for this purpose I preferably provide a plate 71 constituting a cover for said chamber 67 and secured in position by means of bolts or screws 72 passing through bolt holes in said cover plate 71. The said cover plate has preferably integrally formed therewith fuse plug casings herein represented as having an inclined form or position so as to receive and properly position the fuse plugs 52. The said chamber 68 is here shown as having a three terminal element 75 connected with which is a suitable cable 76 having a flexible metallic armor 77 and otherwise preferably similar to the construction shown in Figs. 1 to 4. From the three terminal elements 75 leads a cable 76' to the fuse plugs 52 and from the latter lead suitable conductors 77' to the controller 70, and from the latter lead suitable conductors 78 to the induction or alternating current motor mounted within the casing 79 and head bearings 80 and 81 in a manner similar to that described with reference to Figs. 1 to 4 inclusive. As described with respect to the form of my invention shown in said Figs. 1 to 4, the apparatus contains but a single exposed terminal element, and hence the liability of explosion is reduced to a minimum.

The fuse plugs 52 may be of any suitable construction, but preferably are of the general type shown in my application Ser. No. 837,711. Each of said fuse plugs which is provided with a suitable fuse wire 82 has a suitable holder 83 of mica or other insulation material, on one end of which may be fitted a cap-like terminal 84, and on the opposite end of which may be fitted a cap-like terminal 85. The fuse wire of soft drawn copper or other appropriate material is stretched through the holder from one terminal to the other. To receive and support the plug it is provided with a socket 86 which in turn is received by a sleeve 87 of mica or other suitable insulation material. A shell 88 is fitted tightly over the sleeve. Any other suitable type of fuse plug or equivalent part may, however, be provided.

From the foregoing description, it will be evident that the mining apparatus herein described is peculiarly adapted for use in gaseous mines and that an electrically driven mining apparatus of the general type disclosed herein may be safely operated in such a mine. By the construction herein disclosed, I have succeeded in entirely overcoming all danger of explosions and have produced a mining apparatus characterized by great compactness of construction and arrangement with a balance or symmetry of parts facilitating the proper and accurate movement of the apparatus in operation.

Having thus described one illustrative embodiment of my invention, I desire it to be understood that although specific terms are employed, they are used in a generic and descriptive sense and not for purposes of limitation, the scope of the invention being set forth in the following claims.

I claim:

1. In a mining machine, a bed plate or shoe, an electric motor thereon, power transmission mechanism thereon operatively connected to said motor, a casing enclosing said motor and having flame-proof inlets and outlets communicating with the atmosphere, closed chambers at one end of said casing communicating with said casing and on opposite sides of said transmission mechanism, and motor controlling elements in said chambers.

2. In a mining machine having an electric motor, a casing by which the same is enclosed, a main frame secured to said motor casing, power transmission mechanism carried by said main frame and driven by said motor, and two chambers for the reception of governing means for said motor disposed on opposite sides of said power transmission mechanism, said chambers being formed in said frame at the end thereof connected to said motor casing and adjacent the outer walls of said main frame.

3. In a mining machine having an electric motor, a casing by which the same is enclosed, a main frame secured to said motor casing, two chambers for the reception of governing means for said motor, said chambers being formed in said frame at the end thereof connected to said motor casing and adjacent the outer walls of said main frame, and removable covers for said chambers.

4. In a mining machine having an electric motor, a casing therefor having flame-proof inlets and outlets communicating with the atmosphere, a main frame secured to the motor casing, a chamber formed in said frame and at a surface thereof, said chamber being adapted for the enclosure of governing means for said motor, and a removable cover for said chamber.

5. In a mining machine having an electric motor, an enclosure therefor having flame-proof inlets and outlets communicating with the atmosphere, governing means for said motor, enclosing chambers for said governing means communicating with said enclosure, a single exposed terminal element having a conductor leading thereto from a suitable source, and conductors from said single terminal element to said governing means and said motor.

6. A mining machine having an electric motor an enclosure therefor, a main frame secured to said enclosure, power transmission means carried by said main frame and driven by said motor, corner chambers in said frame disposed on opposite sides of said motor, governing means enclosed in said chambers, a single exposed terminal element having a conductor leading thereto from a suitable source, and conductors from said single terminal element to said governing means and said motor.

7. A mining machine having an electric motor, an enclosure therefor having flame-proof inlets and outlets communicating with the atmosphere, a main frame secured to said enclosure, power transmission means carried by said main frame and driven by said motor, enclosing chambers in said main frame disposed on opposite sides of said motor and communicating with said enclosure, a controller for said motor in one of said chambers, a resistance for the motor in another of said chambers, and conductors for said controller, resistance and motor.

8. A mining machine having an electric motor, a body casing therefor having flame-proof inlets and outlets communicating with the atmosphere, a rear bearing head secured to said casing, a main driving shaft for said motor extending through said bearing head and having a gear, a main frame secured to said rear bearing head, power transmission means carried by said frame and driven by said gear, enclosed chambers communicating with said casing and disposed on opposite sides of said gear, and motor controlling elements in said chambers.

9. In a mining machine having an electric motor, a casing therefor having flame-proof inlets and outlets communicating with the atmosphere, a frame, said frame having a chamber, a cover plate for said chamber having fuse plug casings, and one or more fuse plugs mounted in said casings and projecting into said chamber.

10. A mining machine having an electric motor, and comprising a supporting and enclosing flame-proof casing, said casing having a bottom plate, a frame secured thereon, a body casing section secured on said frame and enclosing the motor and extended beyond said motor at one end to enclose the motor-controlling means, a head secured on one end of said casing and provided with a bearing for the motor shaft, a head secured to the other end of the casing and provided with a bearing for the motor shaft which latter extends through said head, power-transmitting mechanism mounted on said bottom plate and connected with the motor shaft, and series of plates carried by said heads having between them spaces arranged around the motor shaft to form narrow flame-proof air openings which extend radially inward from the outer to the inner parts of said heads.

11. A flame-proof electric mining machine comprising an electric motor having a casing, control means for said motor, transmission mechanism connected to said motor, said elements being so disposed and enclosed as to produce a substantially smooth surfaced machine body having top and side surfaces in substantially the same planes as the corresponding surfaces of the motor casing, and means for rendering said control means and said motor flame-proof located substantially within the cross sectional limits of said body.

12. A flame-proof electric mining machine comprising an electric motor, control means therefor, transmission mechanism connected to said motor, said elements being so disposed and enclosed as to produce a substantially smooth surfaced machine body of substantially the cross section of the motor casing, and means for rendering said motor and said control means flame-proof located substantially within the cross sectional limits of said body, said last mentioned means including a series of plates disposed between said motor and the atmosphere and between said motor and said control means and arranged to form narrow flame-proof air openings through which said motor and control means have communication with the atmosphere.

13. A flame-proof electric mining machine comprising an electric motor, control means therefor, transmission mechanism connected to said motor, said elements being so disposed and enclosed as to produce a substantially smooth surfaced machine body of substantially the cross section of the motor casing, and means for rendering said motor and said control means flame-proof located substantially within the cross sectional limits of said body, said last mentioned means including a series of plates disposed between said motor and the atmosphere and said motor and said control means and arranged to form narrow flame-proof air openings, said body providing a plurality of chambers enclosing said control means.

14. A flame-proof electric mining machine comprising an electric motor, control means therefor, transmission mechanism connected to said motor, said elements being so disposed and enclosed as to produce a substantially smooth surfaced machine body of substantially the cross section of the motor casing, and means for rendering said motor and said control means flame-proof located substantially within the cross sectional limits of said body, said last mentioned means including a series of plates disposed between said motor and the atmosphere and between said motor and said control means and arranged to form narrow flame-proof air openings, and a plurality of chambers enclosing said control means and having communication with the atmosphere through said openings.

15. A flame-proof mining machine comprising an electric motor, control means therefor, transmission mechanism operatively connected to and disposed at one end of said motor, and means for rendering both said motor and said control means flame-proof while retaining the cross section of the machine throughout its length substantially that of the motor comprising a plurality of laminated flame-proof rings between the motor armature chamber and the atmosphere arranged concentrically with the motor shaft at opposite ends thereof and a plurality of compartments for said control means disposed between one of said rings and said transmission mechanism.

16. A flame-proof mining machine comprising an electric motor, control means therefor, transmission mechanism operatively connected to and disposed at one end of said motor, and means for rendering both said motor and said control means flame-proof while retaining the cross section of the machine throughout its length substantially that of the motor comprising a plurality of laminated flame-proof rings between the motor armature chamber and the atmosphere arranged concentrically with the motor shaft at opposite ends thereof and a plurality of compartments for said controller means disposed between one of said rings and said transmission mechanism, said compartments being disposed on opposite sides of the axis of the motor shaft and communicating with the atmosphere only through said flame-proof rings.

17. A flame-proof electric mining machine comprising an electric motor having a casing, control means for said motor, transmission mechanism connected to said motor, said elements being disposed and enclosed within a second casing rigidly attached to said motor casing, and means for rendering said control means and said motor flame-proof.

18. A flame-proof electric mining machine comprising an electric motor having a casing, a second casing rigidly attached to said motor casing, chambers enclosed by said second casing, control means for said motor arranged within one chamber, transmission mechanism connected to said motor and arranged within said second chamber, and means associated with said casings and chambers for rendering the motor control means flame-proof.

19. In a mining machine having an electric motor and transmission mechanism driven by said motor and governing means for said motor, a casing having an upper surface whose top is substantially plane and whose height is determined by the height of the top of the motor, said casing having portions respectively housing said motor, and said transmission mechanism, and said motor governing means, and means for rendering said motor and said governing means flame-proof located within the boundaries of said casing.

MORRIS P. HOLMES.